March 3, 1931. D. E. ROSS 1,795,182

CORN STALK AND CLOD CUTTER ATTACHMENT FOR TRACTORS

Filed Oct. 13, 1928   2 Sheets-Sheet 1

INVENTOR.
David E. Ross
BY
Alexander Earl
ATTORNEYS

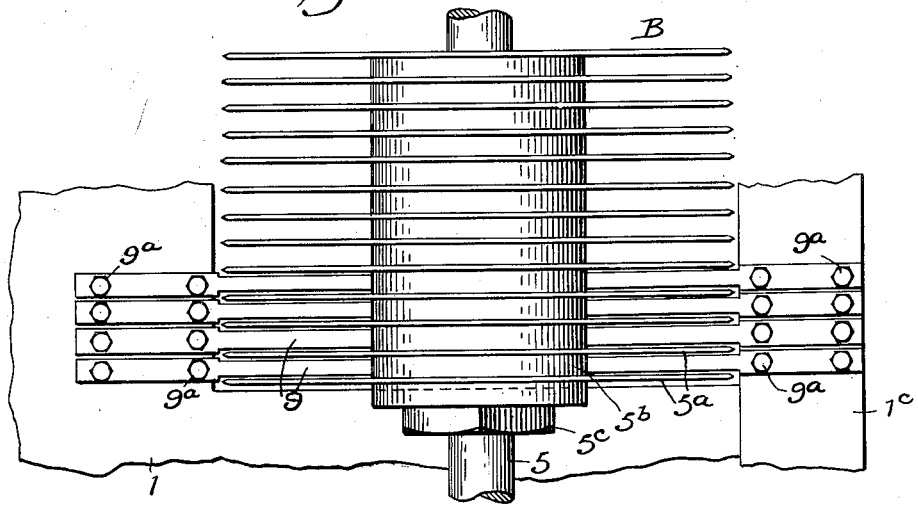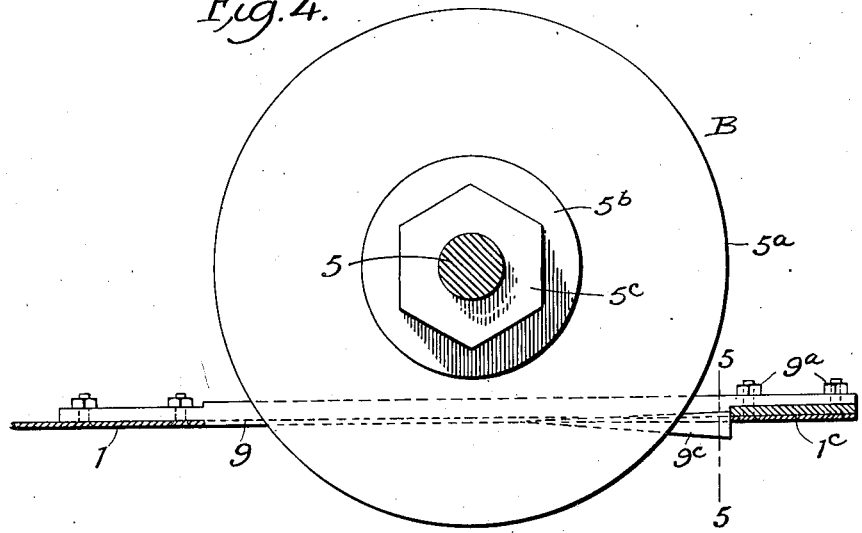

Patented Mar. 3, 1931

1,795,182

UNITED STATES PATENT OFFICE

DAVID E. ROSS, OF LAFAYETTE, INDIANA, ASSIGNOR TO TRUSTEES OF PURDUE UNIVERSITY, OF LAFAYETTE, INDIANA, A CORPORATION OF INDIANA

CORNSTALK AND CLOD CUTTER ATTACHMENT FOR TRACTORS

Application filed October 13, 1928. Serial No. 312,381.

This invention is a novel machine for cutting cornstalks and clods and it is particularly designed for attachment to a well known commercial type of tractor, although it may be self propelled or driven.

The present invention relates to machines of the types illustrated in my companion applications filed March 19th, 1928, Serial No. 262,743; and filed April 19th, 1928, Serial No. 271,262.

The invention is especially adapted for shredding or cutting corn stubble, corn stalks, clods and the like; and its objects are to reduce the weight of the operative parts; to insure thorough cutting of stalks, stubble, trash, etc.; and to enable the depth to which the cutters will operate to be easily regulated. Other objects and advantages of the invention will be hereinafter set forth.

I have illustrated one practical machine embodying the invention in the accompanying drawings and will describe the same to enable others to adopt and use the invention. In the claims the essentials of the invention and the novel features of construction and novel combinations of parts for which protection is desired are set forth concisely.

In said drawings:—

Fig. 3 is an enlarged detail top plan view of part of one of the cutting cylinders and cooperating clearing bars.

Fig. 4 is a side view of Fig. 3.

Fig. 5 is an enlarged detail section through one of the clearing bars on the line 5—5 of Fig. 4.

Figure 2:
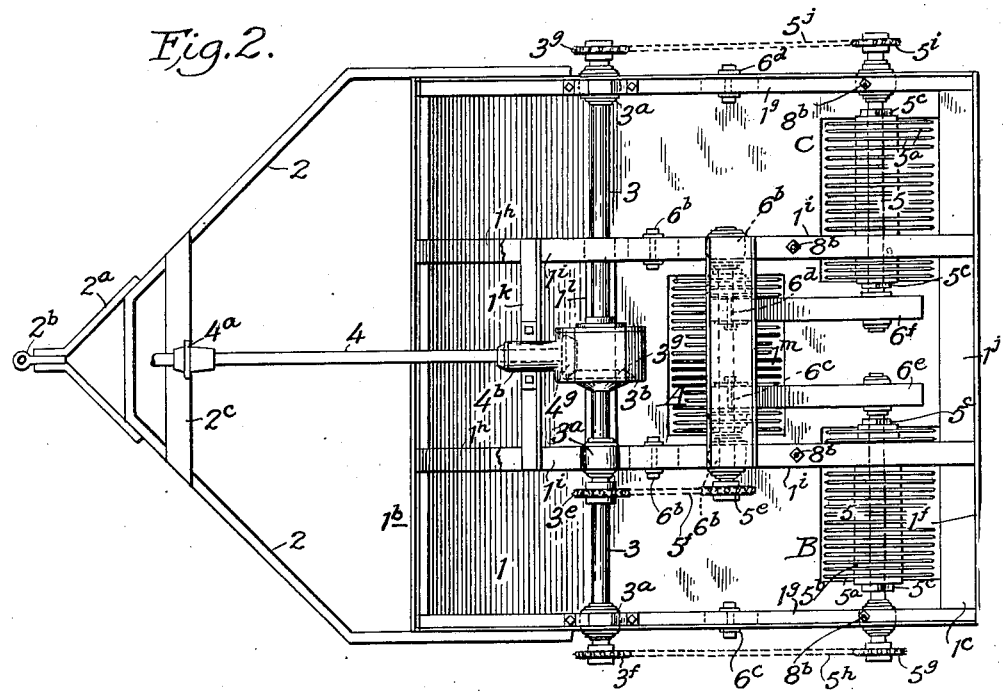
Fig. 2 is an enlarged plan view of the machine detached from the tractor.

In the embodiment of the invention shown in the drawing the machine has a sled-like body which is adapted to be dragged over the surface to be operated upon. The body has a metal bottom plate 1 upturned at its forward end and attached to angle bars 1a at its sides which bars extend from the rear to the front of the plate. The front edge of the plate is attached to a transverse angle bar 1b; and the rear end of the plate is attached to a transversely disposed angle bar 1c. To the rear ends of the bars 1a are attached standards 1e which may be braced by cross bars 1f. The upper ends of the standards 1e are connected by side angle bars 1g to the front bar 1b. The base plate 1 may also be strengthened by spaced angle bars 1h arranged parallel with and between side bars 1a. And above the bars 1h may be similarly located bars 1i which are attached to the front bar 1b and the rear top bar 1j of the frame. The bars 1i may be connected by transverse bars 1k, 1l and 1m. The sides of the frame may be further stiffened and braced by vertical bars 1n, 1o, 1p, as indicated in the drawings. The whole makes a substantial sled-like body.

Figure 1:
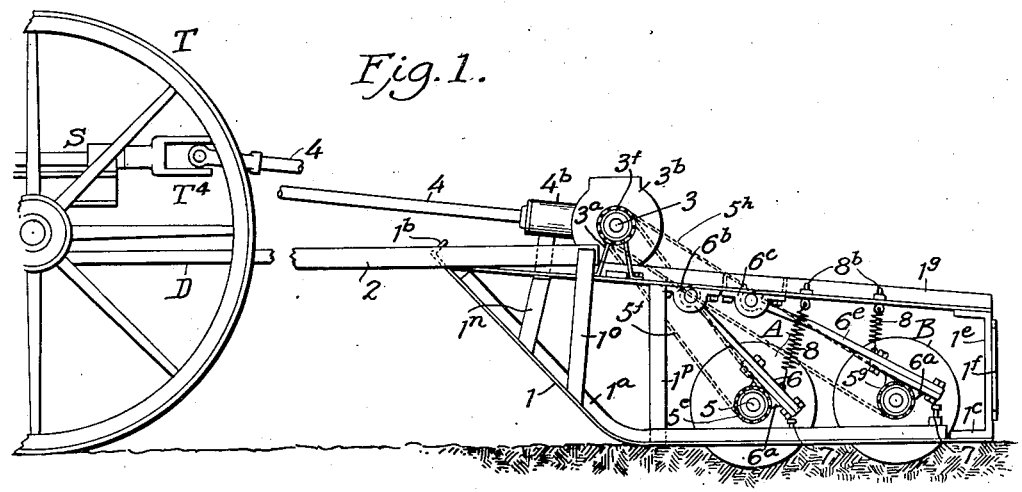
Figure 1 is a side elevation of the machine as attached to a tractor.

The specific construction of the body however is not a feature of the invention; but a body constructed as illustrated in the drawings is very rigid, and strong, and able to support and carry the operative parts. As shown in Figs. 1 and 2 to the forward end of the body is connected a V-shaped yoke 2, which may be also made of angle iron, and to the yoke is attached a front plate 2a provided with an eye 2b for attachment to a tractor.

Journaled in suitable bearings 3a on the top bars of the body and near the forward end thereof is a transversely disposed shaft 3, which can be driven by any suitable means. As shown it is geared to a longitudinally disposed shaft 4 journaled in bearings 4a, 4b respectively mounted on bar 2c and on the bar 1k of the frame. The gearing between the shafts 4 and 3 may be enclosed in a housing 3b to protect the same as indicated in Figs. 1 and 2.

This sled-like body is adapted to carry one or more cutting cylinders which are preferably so mounted thereon as to be capable of vertical movement relative thereto, or of being raised and lowered relative to the base plate 1. The said cylinders can be rotated during the operation of the machine by suitable power, preferably obtained from a tractor by which the machine can be also drawn over the ground to be operated upon.

In the particular embodiment of the invention illustrated in the drawing I preferably employ three such cutting cylinders (A, B, C,) one cylinder A being arranged about the center of the plate 1 or frame, and the other cylinders (B and C) being arranged in rear of the cylinder A and adjacent the opposite ends thereof; so that altogether the three cylinders A, B, C will cut a swath approximately as wide as the body.

The cutting cylinders may be constructed alike; and preferably each is composed of an axial shaft 5 upon which is mounted a series of cutting disks 5a separated by interposed spacers 5b of less diameter than the disks. The series of cutting disks and spacers may be confined on the shaft by suitable means, such as collars or nuts 5c clamped or otherwise suitably secured on the shaft, so that the series of spacers and cutters are securely held in position upon the shaft.

The shaft 5 of the cylinder A is journaled in bearings 6a attached to the free end of bars 6 which are pivoted at their forward ends to brackets or hangers 6b which may be attached to the transverse bars 1i. The shaft 5 of cylinder B is similarly journaled in bearings 6a attached to bars 6e pivoted to hangers 6c respectively attached to one side bar 1g and to the cross bar 1m, as indicated in Fig. 1. The shaft 5 of the cylinder C is similarly journaled in bearings attached to bars 6f connected to hangers 6d on the other side bar 1g and intermediate bar 1m. Each cylinder is capable of rising and falling movements while being drawn forward with the body.

The cylinders are intended to be positively rotated during the operation of the machine and may be driven by any suitable means. As shown in Fig. 2 the shaft 5 of cylinder A has a sprocket gear 5e on one end connected by a sprocket chain 5f to a sprocket 3e on shaft 3. Similarly shaft 5 of cylinder B may have a sprocket 5g connected by a sprocket chain 5h to a sprocket 3f on shaft 3. Similarly shaft 5 of cylinder C has a sprocket 5i driven by a sprocket chain 5j from a sprocket 3g on shaft 3. Shaft 3 could be driven by any suitable means as by a hydrocarbon motor mounted on the frame but it is preferably driven by a tractor to which the frame is connected and by which the entire machine can be dragged along over the surface of the ground.

The machine may be coupled to a tractor—not shown (but conventionally indicated at T in Fig. 1)—by means of the usual drawbar D which may be coupled to the plate 2b and to the rear axle of the tractor in the usual manner in which vehicles are attached to such tractors. The tractor may be of any suitable type and is provided with a take-off shaft S which may be connected by universal couplings and telescopic joints to the forward end of the shaft 4, as shown and described in my aforesaid application, Serial No. 271,262. When the machine is coupled to the tractor, as shown in Fig. 1 the motor which propels the tractor is used to drive the cylinders through the described power connections.

The desired ratio of peripheral speed of the disks or cutting cylinders when the machine is in operation, may be secured by properly proportioning the gearing between the shafts 3 and 4.

In order to regulate the depth at which the cutters may extend below the plate 1 adjustable stop bolts 7 may be attached to the frame as indicated in Figs. 1 and 2 to limit the downward movement of member 6.

If desired the bars (6, 6e, 6d) may also be connected with contractile springs 8 which are adjustably connected by bolts 8b or other suitable means to overlying members of the frame; so that the tension of the springs can be regulated to take some of the dead weight of the cylinders, if that is desired, and transfer part of the dead weight of the cylinders onto the frame.

In this machine the cutting cylinders may be made light, as compared with those in my former application for each of the cutting cylinders operates through an opening in the base plate 1. In order to prevent trash or dirt from crowding through these openings, and to keep the cutters clear of trash, and to assist in cutting and disintegrating materials underlying the plate, I provide a series of parallel bars 9, which are arranged respectively intermediate adjacent pairs of cutters in each cylinder (see Figs. 3 and 4). These bars 9 extend longitudinally of the base frame and are fastened by means, suitable as by bolts 9a, at front and rear to the plate 1 or adjacent part of the frame. These bars 9 lie between adjacent cutters and act as clearers and also to hold the underlying stalks etc. close to the ground so that the cutters will effectively operate thereon.

Preferably each of these bars is provided on its underside adjacent its rear end with a depending cutting portion or rib 9c, which is adapted to further cut or disintegrate small sections of stalks which are severed by or between the cutters 5a.

In operation the machine is drawn by the tractor over the ground. When the cylinders are lowered in operative position when the machine is moved forward the cylinders are rotated and the cutters cut the underlying stalks and stubble on the surface of the ground, and the roots below the surface;

virtually every inch of the ground being covered and cut by the blades. The circular cutters are kept clean by the bars 9 and centrifugal force also assists in keeping them free from accumulations of trash or earth.

It is desirable to have the cylinders positively rotated at a higher peripheral speed than would be obtainable by merely rolling them across the surface of the ground, or than the forward movement of the body. In the construction shown, the rollers are positively driven from the tractor as above described. The R. P. M. at which the cylinders should operate will vary under actual working conditions; but for killing borers the cylinders should have a higher peripheral speed than when merely cutting clods or trash.

When the machine is moved over the ground the sled-like body crushes the underlying stalks, stubble and trash flat upon the surface of the ground and holds the same down while the cylinders are operating thereupon. The depth at which the cutters operate below the bottom plate and project into the surface of the ground can be regulated by limiting the extent to which the cylinders can drop relative to said plate. By adjusting the springs more or less of the weight of the cylinders can be transferred to the body, so that the actual operative weight of the cylinders and cutters upon the trash can be varied and be made greater or less according to the adjustment of the springs or connections between the cylinders and the body.

The cutters can be placed as closely together on the shafts as is necessary to reduce the trash or other material operated upon to as fine a condition as may be desired. For transport the cylinders can be raised on the body above the surface of the plate if desired.

I claim:—

1. In a machine of the character specified a body having a bottom plate, a cutting cylinder provided with a plurality of cutters adapted to operate through an opening in the bottom plate, means yieldably connecting the cylinder with the body and means for positively rotating the cylinder independently of the movement of the body.

2. In a machine as set forth in claim 1 means for limiting the projection of the cutting disks below the plate.

3. In a machine as set forth in claim 1, spring means for transferring part of the weight of the cylinder to the body.

4. In a machine of the character specified, a body having a bottom plate provided with openings, a cutting cylinder provided with a series of cutting disks adapted to operate through the opening, swingable bars connecting the cylinder to the body, and means for positively rotating the cylinder independently of the movement of the body.

5. In a machine as set forth in claim 4, means for regulating the movement of the cylinder relative to the body to limit the projection of the cutters below the body.

6. In a machine as set forth in claim 4 spring means for transferring part of the weight of the cylinder to the body.

7. A machine for the purpose specified comprising a body, having slots in its bottom, a plurality of rotatable cutting cylinders connected with said body and each provided with a plurality of cutting disks adapted to operate through the slots and capable of rising and falling movement relative thereto, and means for limiting the projection of the cutting disks below the body.

8. In a machine as set forth in claim 7, spring means for transferring part of the weight of the cylinder to the body.

9. A machine for the purpose specified comprising a body having a base plate provided with openings, and a plurality of rotatable cutting cylinders mounted on said body and capable of rising and falling movement relative thereto, each cylinder having a plurality of cutting disks adapted to project below the bottom plate through openings therein.

10. In mechanism as set forth in claim 9, means for positively driving the cutting cylinders.

11. In a machine as set forth in claim 9, spring means for transferring part of the weight of the cylinder to the body.

12. In mechanism as set forth in claim 9, means for regulating the depth at which the cutting disks can project below the body.

13. A machine for the purpose specified comprising a sled-like body provided with a plurality of slots, a plurality of cutting cylinders each provided with a plurality of cutting disks, said cylinders being arranged together to extend approximately across the entire width of the body, and said disks depending through the slots; and means for yieldably mounting the cylinders on the body so that each is capable of rising and falling movement relative thereto.

14. In a machine as set forth in claim 13, means for transferring part of the weight of the cylinders to the body.

15. In a machine of the character specified; a body having a bottom plate provided with an opening, a cutting cylinder mounted on the body above the opening in the bottom plate, said cylinder having a plurality of cutting disks adapted to project below the bottom plate through the said opening, and bars attached to bottom plate and extending across the opening and between the cutting disks adapted to hold down the trash while the disks operate thereon.

16. In a machine as set forth in claim 15, said bars being provided with cutting surfaces on their under sides.

17. In a machine of the character specified, a body having a bottom plate provided with a plurality of slots, a cutting cylinder provided with a plurality of cutting disks adapted to project below and operate through the slots in the bottom plate.

18. In a machine of the character specified a body having a bottom plate provided with slots, a cutting cylinder provided with a plurality of cutters adapted to project below and operate through the slots in the bottom plate, means yieldably connecting the cylinder with the body, and means for positively rotating the cylinder.

DAVID E. ROSS.